Patented Apr. 13, 1948

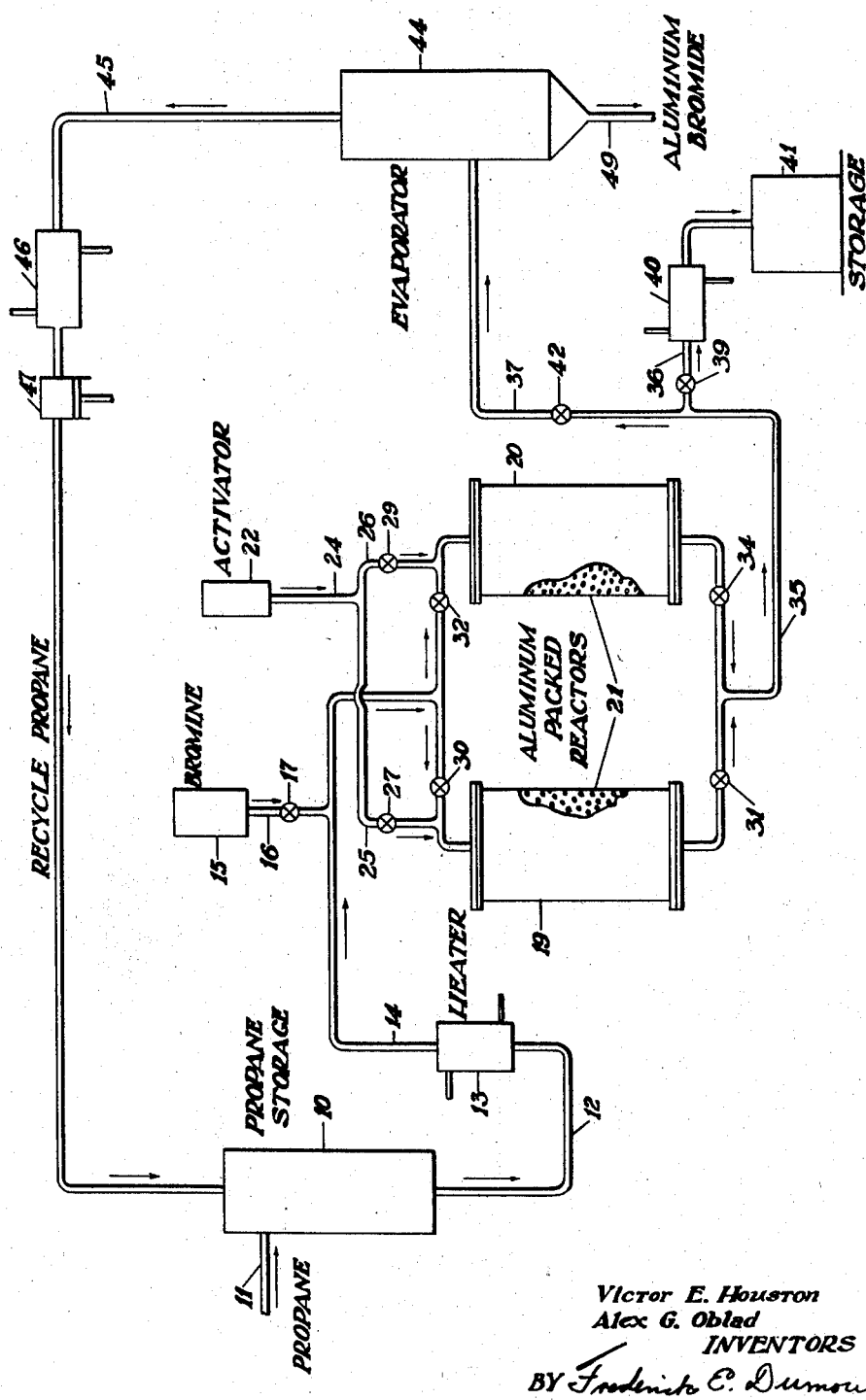

2,439,737

UNITED STATES PATENT OFFICE 2,439,737

MANUFACTURE OF ALUMINUM BROMIDE

Victor E. Houston and Alex G. Oblad, Dallas, Tex., assignors, by mesne assignments, to Socony-Vacuum Oil Company, Incorporated, New York, N. Y., a corporation of New York Application March 5, 1945, Serial No. 581,164

11 Claims. (Cl. 23—93)

This invention relates to the manufacture of aluminum bromide and relates more particularly to the manufacture of aluminum bromide from metallic aluminum.

As is well known, aluminum bromide may be manufactured by the direct combination of metallic aluminum with elemental bromine or by the interaction of metallic aluminum with hydrogen bromide. Both of these reactions are vigorous and highly exothermic and temperatures sufficiently high to cause melting of the aluminum tend to be rapidly attained. Moreover, the corrosive action of the bromine and hydrogen bromide on the reactors is accelerated at high temperatures, and frequent and expensive replacements are thereby necessitated. Accordingly, the prevention of excessive temperature rise is an important consideration in the commercial manufacture of aluminum bromide.

It is an object of the invention to provide a new and improved method for the manufacture of aluminum bromide. It is another object of the invention to provide a low temperature method for the manufacture of aluminum bromide. It is another object of the invention to provide a method for controlling temperature in the manufacture of aluminum bromide. It is another object of the invention to eliminate the difficulties arising from high temperatures in the manufacture of aluminum bromide. Further objects and advantages of the invention will become apparent from the following description thereof.

In accordance with the invention aluminum bromide is manufactured by a process comprising contacting metallic aluminum with an active bromine substance, capable of reacting with metallic aluminum to form aluminum bromide, dissolved in a saturated organic solvent for aluminum bromide in an amount such that the bromine content of the solution is at least five percent by weight.

In carrying out the invention, the active bromine substance is dissolved in the saturated organic solvent and the solution contacted with the metallic aluminum, as, for example, by passing the solution through a bed of aluminum packing. The saturated organic solvent effects a retardation in the rate at which the metallic aluminum reacts to form aluminum bromide and thereby effects a retardation of the rate of temperature rise. As a result of the retarded rate of temperature rise, heat escapes from the reaction unit by conduction at a rate sufficiently high to effect an appreciable lowering of the maximum temperature otherwise attained. Not only does the solvent decrease the temperature by retarding the rate of heat evolution but also, by reason of its heat capacity, decreases the temperature by absorbing the heat of reaction as it is evolved. Thus, by the process of the invention, only moderate increases in temperature are encountered, for example, temperature increases of only a few hundred degrees F. at a maximum, and by a suitable selection of concentrations of bromine in the feed solution, the temperature rise can be maintained within desired limits.

Suitable active bromine substances for use in the process of the invention include elemental bromine and hydrogen bromide, and, if desired, mixtures of active bromine substances may be used. Preferably, however, bromine is employed in view of its economy. The amount of active bromine substance dissolved in the solvent should be such that the bromine content of the resulting solution, either as bromine per se or as bromide, is at least five percent by weight in order that satisfactory yields of aluminum bromide may be obtained. Thus, where bromine is employed, the solution will contain at least five percent by weight of bromine, but where hydrogen bromide is employed, the solution will contain at least 5.06 percent by weight of hydrogen bromide to give at least five percent by weight of bromine. While satisfactory results are obtained employing bromine concentrations of five percent, it is preferred to employ higher concentrations, as, for example, concentrations of twenty percent or higher, in order to obtain high yields of aluminum bromide per weight of solvent employed.

It is a particular feature of the invention that the aluminum bromide as it is formed on the surfaces of the metallic aluminum dissolves in the saturated organic solvent thereby obtaining the desired product in solution form. It has recently been proposed to employ aluminum bromide in the form of a solution as the effective catalytic agent for liquid phase hydrocarbon conversion reactions such as the alkylation of branched chain paraffins with olefins, the isomerization of straight chain paraffins, the polymerization of olefins, etc. In these reactions, the aluminum bromide is generally dissolved in a solvent which may be a solvent employed as a reactant or diluent in the conversion reaction to form a relatively concentrated catalyst solution, and this solution admixed with the hydrocarbon conversion reactant or reactants. Difficulties are encountered, however, in handling the solid aluminum bromide both because of its rapid reaction with the moisture in the atmosphere forming aluminum hydroxide and hydrobromic acid and its slow rate of solution despite its solubility. By the process of the invention, the aluminum bromide is obtained as a solution which may be employed directly in hydrocarbon conversion reaction. Where, of course, the aluminum bromide in solid form is desired, it may be recovered in simple manner from the solution as, for example, by evaporation of the solvent or by cooling to induce crystallization followed by filtration.

Any suitable type of saturated organic solvent in which aluminum bromide is soluble may be employed. If desired, mixtures of solvents may be employed. Suitable solvents are saturated hydrocarbons, such as propane, normal butane, normal pentane, and normal hexane, and the low boiling saturated alkyl halides, such as propyl bromide, propyl chloride, normal butyl bromide, etc. The saturated hydrocarbons, however, are preferred in view of their lower cost. Of the saturated hydrocarbons, propane and normal butane are preferred for the same reason, as well as for the fact that they react to only a slight degree with bromine and hydrogen bromide to form alkyl bromides or with aluminum bromide to form tarry complexes thereby resulting in only a slight loss of active bromine substance otherwise converted to aluminum bromide. When employing solvents capable of isomerizing, it will be found that a certain amount of isomerization will take place, since, as is well known, aluminum bromide is an effective isomerization catalyst. However, this is of no consequence except when employing solvents which isomerize rapidly and whose isomerization products react rapidly with aluminum bromide to form tarry complexes. Thus, when employing such solvents, decreased yields of aluminum bromide will be obtained. Where solvents that isomerize slowly, even though the isomerization products form tarry complexes, are employed, tarry complex formation may be substantially minimized by avoiding delay in separating the aluminum bromide from the solvent, or where the aluminum bromide solution is to be used as a catalyst in hydrocarbon conversion reactions, by avoiding delay in passing the solution to the hydrocarbon conversion zone.

The pressures employed in carrying out the reaction should be sufficiently high to maintain the solvent in the liquid phase. Higher pressures will be employed, however, where required to maintain the desired concentration of active bromine substance in the solution. For example, depending upon the type of solvent and the type of active bromine substance, it may be necessary to employ a pressure higher than the pressure required to maintain the solvent in the liquid phase in order to obtain the desired concentration of active bromine substance in the solution. Under such conditions the reaction will be carried out at the higher pressure in order to prevent the active bromine substance from leaving solution. In batch operations the higher pressure may be employed initially and the pressure gradually reduced, if desired, as the active bromine substance is consumed to form aluminum bromide. In continuous operations, the pressure will be maintained at a constant level, although, if desired, a series of reactors operated at progressively decreased pressures may be employed.

While batch operations may be employed, the reaction is more conveniently carried out as a continuous operation by passing the active bromine solution through a reactor or battery of reactors packed with the metallic aluminum. Any type of reactor suitable for carrying out reactions under pressure may be employed and preferably the reactor is lined with material resistant to the action of bromine and hydrogen bromide. The pipe lines, valves, storage vessels, etc., coming in contact with the active bromine solution, are also preferably lined with or constructed of resistant material. Since comparatively low temperatures are encountered in the reaction, lead may be used for this purpose. Other materials such as stainless steel may also be employed.

The metallic aluminum may be packed into the reactor in the form of turnings, shavings, chips, cubes, etc. It has been found that with fresh aluminum a certain period of time is required for initiation of the reaction. This period required for initiation of the reaction, however, may be eliminated by the use of a suitable activator, such as mercuric bromide. The activator may be added to the active bromine solution at the beginning of operations with fresh aluminum until the reaction has started, after which the use of the activator may be discontinued. If desired, the aluminum may be activated using a separate solution of the activator. Mercuric bromide in concentrations up to one percent in either the active bromine solution or in a separate solution have been found satisfactory. The bromine of the mercuric bromide is displaced by the aluminum forming elemental mercury which remains as such or as a sludge as long as any metallic aluminum remains in the reactor and thereby does not appear as a contaminant in the aluminum bromide product.

The rate of reaction depends upon the temperature and at low temperatures the reaction proceeds at a slow rate gradually increasing as the temperature increases. It is therefore desirable to heat the active bromine solution in order to avoid initial delay in obtaining a satisfactory rate of reaction. The solution may be heated to any desired temperature provided, however, that the solution is not heated to a temperature such that the maximum temperature subsequently attained during the reaction exceeds the critical temperature of the solvent unless it is desired to employ cooling means to maintain the subsequently attained temperature below the critical solvent temperature. Generally, the solution may be heated to temperatures between about 80° F. and 250° F., preferably between about 100° F. to 200° F.

The time required for complete reaction of all the active bromine substance depends upon a combination of factors including the concentration of active bromine substance in the solution, the temperature of reaction, and the surface area of metallic aluminum exposed to the solution. These factors are all interrelated and certain of these factors, particularly the concentration of active bromine substance in the solution and the surface area of the metallic aluminum, do not remain constant but diminish as the reaction proceeds. Accordingly, the optimum reaction time will vary for each set of conditions and is best determined by actual operation. Generally, however, reaction times of about 0.5 to 600 seconds may be employed depending upon conditions, as mentioned.

The following examples will serve to illustrate the results obtainable by the process of the invention.

*Example 1*

A normal butane solution containing 15 percent by weight of bromine was passed continuously through a reactor packed with irregularly shaped aluminum particles having effective diameters of about ⅛ to ½ inch at a space velocity of 70 volumes of solution per volume of aluminum packing per hour. Prior to passing the solution through the reactor, the aluminum packing was activated by contacting with a one percent solution of mercuric bromide in normal butane. The temperature of the solution entering the reactor was 100° F. and the temperature of the solution leaving the reactor was 260° F. The concentration of aluminum bromide in the solution leaving the reactor was about 15.8 percent by weight.

*Example 2*

A propane solution containing 10 percent by weight of bromine was passed continuously through a reactor packed with metallic aluminum as described in Example 1 above, and at the same space velocity. The aluminum packing was previously activated by contacting with a one percent solution of mercuric bromide in propane. The temperature of the solution entering the reactor was 80° F. and the temperature of the solution leaving the reactor was 180° F. The concentration of aluminum bromide in the solution leaving the reactor was about 10.5 percent by weight.

The accompanying drawing is a flowsheet schematically illustrating one method of carrying out the process of the invention employing propane as the solvent.

Referring to the drawing, liquid propane is withdrawn from storage tank 10 provided with propane feed inlet line 11 and passed through line 12 to heater 13 where it is heated to the desired temperature. The heated propane is passed through line 14 where it is admixed with liquid bromine entering from tank 15 through line 16 provided with valve 17. The solution then passes through either or both reactors 19 and 20 packed with metallic aluminum 21. Mercuric bromide activator in solution in propane is passed from tank 22 through line 24 and thence through either or both lines 25 and 26 for admixture with the bromine solution entering reactors 19 and 20, respectively. After the reaction has been initiated in the reactors, the flow of activator into the solution entering the reactors 19 and 20 is discontinued by closing valves 27 and 29, respectively. Reactors 19 and 20, as shown, are connected in parallel in order that continuous operation may be maintained by leaving one reactor on stream while the other reactor is off stream for recharging with fresh aluminum. Reactor 19 may be taken off stream by closing valves 30 and 31, and reactor 20 may be taken off stream by closing valves 32 and 34. After each reactor has been recharged and put back on stream, the reaction may be initiated by opening the proper valve, either 27 or 29, after which the valve is again closed.

The aluminum bromide solution leaves the reactors through line 35 and then through either of the lines 36 and 37 depending upon whether it is desired to leave the aluminum bromide in solution or recover it in solid form. If desired to leave the aluminum bromide in solution, the solution in line 35 is passed through line 36 containing valve 39 and cooled in cooler 40. The solution is then passed to storage tank 41 from which it may be removed for use when desired. If it is desired to recover the aluminum bromide in solid form, the solution in line 35 is passed through line 37 containing valve 42 to evaporator 44 where the propane solvent is separated from the aluminum bromide by evaporation. The propane leaves the evaporator as overhead through line 45 and is then liquefied by cooling in cooler 46 and compressing in compressor 47, after which it is recycled to the storage tank 10 for reuse. The aluminum bromide is recovered from the bottom of the evaporator through hopper 49.

Having thus described our invention, it is to be understood that such description has been given by way of illustration and example only and not by way of limitation, reference being had for the latter purpose to the appended claims.

We claim:

1. The process of producing aluminum bromide comprising contacting metallic aluminum with a material selected from the group consisting of bromine and hydrogen bromide dissolved in a substantially anhydrous saturated organic solvent in which aluminum bromide is soluble, said material being dissolved in said organic solvent in an amount such that the bromine content of the solution is at least five percent by weight.

2. The process of producing aluminum bromide comprising contacting metallic aluminum with a solution of bromine in a substantially anhydrous saturated organic solvent in which aluminum bromide is soluble, said solution containing at least five per cent by weight of bromine.

3. The process of producing aluminum bromide comprising contacting metallic aluminum with a solution of hydrogen bromide in a substantially anhydrous saturated organic solvent in which aluminum bromide is soluble, said solution containing said hydrogen bromide in an amount such that the bromine content of said solution is at least five percent by weight.

4. The process of producing aluminum bromide comprising contacting metallic aluminum with a material selected from the group consisting of bromine and hydrogen bromide dissolved in a substantially anhydrous saturated hydrocarbon solvent in which aluminum bromide is soluble, said material being dissolved in said hydrocarbon solvent in an amount such that the bromine content of the solution is at least five percent by weight.

5. The process of producing aluminum bromide comprising contacting metallic aluminum with a solution of bromine in a substantially anhydrous saturated hydrocarbon solvent in which aluminum bromide is soluble, said solution containing at least five percent by weight of bromine.

6. The process of producing aluminum bromide comprising contacting metallic aluminum with a solution of hydrogen bromide in a substantially anhydrous saturated hydrocarbon solvent in which aluminum bromide is soluble, said solution containing said hydrogen bromide in an amount such that the bromine content of said solution is at least five percent by weight.

7. The process of producing aluminum bromide comprising contacting metallic aluminum with a material selected from the group consisting of bromine and hydrogen bromide dissolved in substantially anhydrous liquid propane, said material being dissolved in said propane in an amount such that the bromine content of the solution is at least five percent by weight.

8. The process of producing aluminum bromide comprising contacting metallic aluminum with a solution of bromine in substantially anhydrous liquid propane, said solution containing at least five percent by weight of bromine.

9. The process of producing aluminum bromide comprising contacting metallic aluminum with a solution of bromine in substantially anhydrous liquid normal butane, said solution containing at least five percent by weight of bromine.

10. The process of producing aluminum bromide comprising contacting metallic aluminum with a solution of hydrogen bromide in substantially anhydrous liquid normal butane, said solution containing said hydrogen bromide in an amount such that the bromine content of said solution is at least five percent by weight.

11. The process of producing solid aluminum bromide comprising contacting metallic aluminum with a material selected from the group consisting of bromine and hydrogen bromide dissolved in a substantially anhydrous saturated organic solvent in which aluminum bromide is soluble, said material being dissolved in said organic solvent in an amount such that the bromine content of the solution is at least five percent by weight, whereby a solution of aluminum bromide in said solvent is formed, and thereafter recovering said aluminum bromide in solid form from said solvent.

VICTOR E. HOUSTON.
ALEX G. OBLAD.

REFERENCES CITED

The following references are of record in the file of this patent:

UNITED STATES PATENTS

| Number | Name | Date |
| --- | --- | --- |
| 2,010,756 | Genter | Aug. 6, 1935 |
| 2,057,306 | Martin | Oct. 13, 1936 |